Sept. 9, 1941.   J. M. SIMPSON   2,255,591
HYDRAULIC TORQUE CONVERTER
Filed Feb. 23, 1940
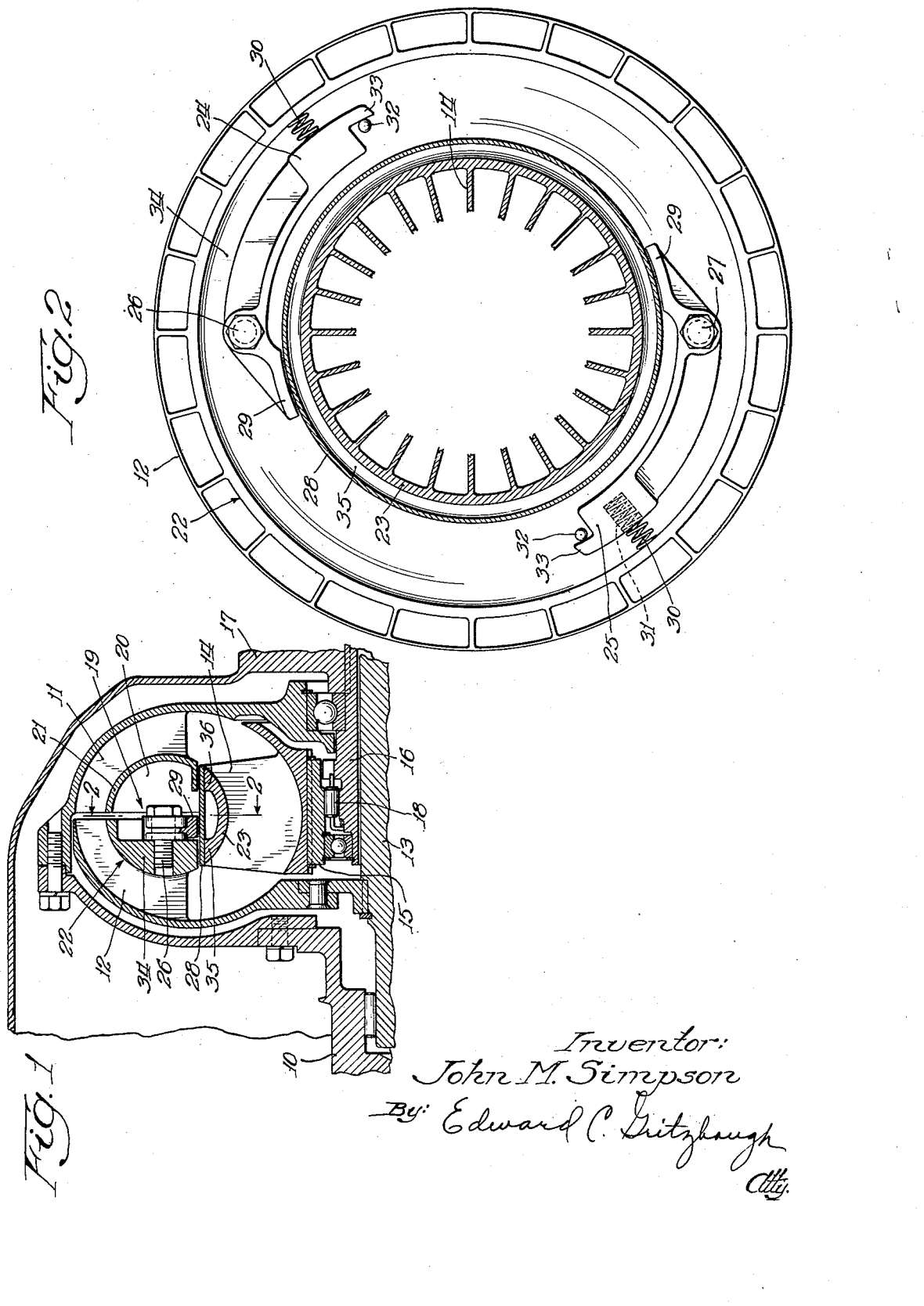

Patented Sept. 9, 1941

2,255,591

UNITED STATES PATENT OFFICE 2,255,591

HYDRAULIC TORQUE CONVERTER

John M. Simpson, Muncie, Ind., assignor to Borg-Warner Corporation, Chicago, Ill., a corporation of Illinois Application February 23, 1940, Serial No. 320,291

4 Claims. (Cl. 60—54)

This invention relates to hydrodynamic torque converters having vaned pump, turbine and stator elements.

Hydrodynamic torque converters which are designed for sustained high speed drive are usually provided with some means for minimizing the interference of the stator when it is no longer necessary to multiply torque. Such means may take the form of a one way brake acting upon the stator to prevent the stator from rotating backwards, and thereby take the reaction of the circulating fluid, and to permit the stator to rotate in the same direction as the pump when the direction of the fluid is such as to cause it to impinge upon the backs of the stator vanes, i. e., when there is no longer any torque conversion taking place. Under the latter condition, the stator is merely dragged along by the fluid without in any way assisting in carrying the load. Such action reduces the efficiency of the converter, and consequently is undesirable.

It has been proposed to connect the stator to one of the other elements of the converter when it is no longer serving as a reaction member in order to assist either in imparting energy to the fluid (connected to the pump) or to assist the turbine in extracting energy from the fluid to carry the load. Such prior proposals have been for the most part complicated, requiring that a brake be released and a clutch engaged, or vice versa, which is usually an awkward maneuver, and also requiring that the change from brake to clutch be properly timed so as to take full advantage of the torque conversion.

The object of this invention is to provide a simple means for connecting a stator to one of the other elements of a torque converter after the stator is no longer serving as a reaction member, said means being automatically operated.

The preferred embodiment of this invention is shown in the accompanying drawing which forms a part of this specification, and in which:

Fig. 1 is a partial side elevation in section showing a hydrodynamic torque converter in which the novel connecting means is installed; and Fig. 2 is a front elevation in section of the converter.

The connecting means comprises a centrifugally controlled clutch located in the core ring of the converter and cooperating with a one-way brake on the stator, the clutch being designed to take hold when the efficiency of the converter is at a maximum.

Referring now to the drawing, the drive shaft 10 of a prime mover (not shown) is connected to the vaned pump element 11, of a torque converter, the turbine element 12 of which is drivingly connected to driven shaft 13. The stator 14 is splined to a collar 15 which is rotatably mounted on a sleeve 16 fixed to housing 17.

Between sleeve 17 and collar 15 is a one-way brake 18 of the roller type which permits collar 15, and consequently stator 14, to rotate in the same direction as turbine 12, but prevents the collar from rotating in the opposite direction. When the load on driven shaft 13 is great and turbine 12 is rotating slowly, the fluid with which the converter is filled tends to rotate stator 14 backwards and the latter then serves as a reaction member to convert torque. On the other hand, when the load is light, turbine 12 rotates at a higher speed and the fluid tends to rotate the stator 14 in the same direction as pump 12. One-way brake 18 releases under the latter condition and the stator is free to rotate.

Normally, stator 14 would merely impede the progress of the fluid and materially decrease the efficiency of the converter. In accordance with this invention, however, the stator is connected to the driven turbine 12 and made to assist in carrying the load. The connecting means comprises an automatic clutch 19 which is so designed as to couple stator 14 to turbine 12 at approximately the instant when the efficiency of the turbine is a maximum.

Clutch 19 is located within core ring 20 of the turbine, the ring being defined by flanges 21, 22 and 23 on pump 11, turbine 12, and stator 14, respectively. The space within core ring 20 is usually wasted and this location of clutch 19 consequently adds nothing to the size of the converter. Furthermore, clutch 19 is protected by the surrounding elements of the converter and is less likely to be tampered with when the converter is serviced.

The principal elements of clutch 19 are a pair of weights 24 and 25 mounted on pivots 26 and 27 respectively, on flange 22, and a drum 28 on flange 23 of stator 14. Although two weights are shown, it is understood that the number may be increased as desired or found to be expedient, it merely being required that the weights be arranged about the turbine in a balanced relation. Each weight is provided with an extension opposite the pivots in the form of a shoe 29 which is adapted to bear upon drum 28 and thereby drive said drum. Weights 24 and 25 are normally held in a retracted position by springs 30 set in recesses 31 in the weights and compressed against flange 22. The action of springs 30 is limited by pins 32 extending axially from flange 22 and cooperating with extensions 33 on the weights. Flange 22 is reinforced at 34 to accommodate pivots 26 and 27.

Flange 23 of stator 14 is reinforced at 35 and 36 to provide cylindrical surfaces to which drum 28 may be secured. Drum 28 is preferably made from a material which is adapted to provide the necessary friction when it is submerged in oil. It is secured to stator 14 by welding or otherwise.

In operation, pump 11 will be rotated by drive shaft 10, setting the fluid in motion. As the speed of the fluid increases, it will impinge upon turbine 12 and start said turbine to rotating. Stator 14 will be held against backward rotation by one-way brake 18 and the torque of the drive shaft 10 will be multiplied in driven shaft 13. As the load on the driven shaft 13 is decreased, its speed and the speed of turbine 12 will increase. When the speed at which clutch 19 is set to operate is reached, weights 24 and 25 will be thrown outwardly a sufficient distance to cause shoes 29 to engage drum 28 and couple stator 14 to turbine 12. This speed is preferably the speed at which the efficiency of the converter as such is a maximum. From this point on, the converter acts as a fluid coupling with the stator assisting the turbine in extracting energy from the fluid.

It will be observed that the release of the brake is automatic and that no control is required to be actuated and coordinated with the clutch in order to provide a smooth transition from torque conversion to simple fluid coupling operation.

It is understood that the foregoing description is merely illustrative of a preferred embodiment of the invention, and that the scope of the invention is not to be limited thereto, but is to be determined by the appended claims.

I claim:

1. In a torque converter of the hydrodynamic type a pump element, a turbine element and a stator element, said elements defining a chamber for the circulation of fluid, and means for locking the stator to the turbine, said locking means comprising a friction surface on the stator and centrifugally controlled means on the turbine adapted to grip the friction surface above a predetermined speed of rotation of the turbine.

2. In a torque converter of the hydrodynamic type having concentric pump, turbine and stator elements defining a chamber for the circulation of fluid, means for locking the stator to the turbine to increase the efficiency of the converter, said locking means comprising a drum rotatable with the stator and centrifugally controlled friction means on the turbine adapted to engage the drum above a predetermined speed of rotation of the turbine.

3. In a torque converter of the hydrodynamic type having concentric pump, turbine and stator elements defining a chamber for the circulation of fluid, said elements being formed from cast material, means for locking the stator to the turbine to increase the efficiency of the converter, said locking means comprising a drum welded to the stator and formed from different material than the stator, and pivoted weights on the turbine having friction shoes thereon adapted to contact the drum above a predetermined speed of rotation of the turbine.

4. In a torque converter of the hydrodynamic type having concentric pump, turbine and stator elements made of cast metal and defining a chamber for the circulation of fluid, a hollow core ring in the chamber, and means within the core ring for locking the stator to the turbine above a predetermined speed of rotation of the turbine to increase the efficiency of the converter, said means comprising a drum of different material within the core ring and welded to the stator, and pivoted weights mounted on the turbine in the core ring and having friction shoes thereon adapted to contact the drum above a predetermined speed of rotation of the turbine.

JOHN M. SIMPSON.